US012792479B1

(12) United States Patent
Choudhary et al.

(10) Patent No.: US 12,792,479 B1

(45) Date of Patent: Nov. 10, 2026

(54) CACHESYNC: EFFICIENT CACHE SYNCHRONIZATION WITH ONLINE MIRRORS FOR SEAMLESS WORKLOAD TRANSITION ACROSS FAILURES

(71) Applicant: Oracle International Corporation, Redwood Shores, CA (US)

(72) Inventors: Siddharth Choudhary, Belmont, CA (US); Vijay Sridharan, Santa Clara, CA (US); Dongqiao Ma, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/222,735

(22) Filed: May 29, 2025

(51) Int. Cl.
*G06F 11/20* (2006.01)
*G06F 11/1446* (2026.01)

(52) U.S. Cl.
CPC ...... *G06F 11/2082* (2013.01); *G06F 11/1469* (2013.01); *G06F 11/2025* (2013.01)

(58) Field of Classification Search
CPC ............. G06F 11/2082; G06F 11/1469; G06F 11/2025
See application file for complete search history.

(56) References Cited

U.S. PATENT DOCUMENTS

| | | | | |
|---|---|---|---|---|
| 10,230,809 | B2 * | 3/2019 | Raghunath | G06F 12/0868 |
| 10,318,325 | B2 * | 6/2019 | Chambliss | H04L 67/148 |
| 2015/0149729 | A1 * | 5/2015 | Hu | G06F 3/0613 711/136 |
| 2015/0229717 | A1 * | 8/2015 | Gupta | H04L 67/34 718/1 |

* cited by examiner

*Primary Examiner* — Jigar P Patel

(74) *Attorney, Agent, or Firm* — Hickman Becker Bingham Ledesma LLP

(57) ABSTRACT

Cache prefilling is accelerated by avoidance of persistent storage and by bulk transfer from source caches in a source storage computer to target caches in a target storage computer. The target storage computer persists a target replica set of files. The caches are not in backing storage of the storage computers. Received from the source storage computer, persistence addresses indicate which data items are in source caches of the source storage computer. From the source storage computer, based on persistence addresses of remotely and locally cached data items, a subset of the remotely cached data items is requested. The subset of cached data items is stored into the target caches, and execution of a data access may be accelerated by reading a cached data item from a target cache.

20 Claims, 5 Drawing Sheets

CACHESYNC: EFFICIENT CACHE SYNCHRONIZATION WITH ONLINE MIRRORS FOR SEAMLESS WORKLOAD TRANSITION ACROSS FAILURES

FIELD OF THE DISCLOSURE

This disclosure relates to cache prefilling that is accelerated by avoidance of persistent storage and by bulk transfer from caches of a remote computer.

BACKGROUND

With distributed file systems, files may be mirrored, and computers may have topological roles such as primary, standby, leader, follower, or peer for high availability by redundancy. Any disruptive change in topology due to a planned maintenance event or an unplanned failure event can decelerate input/output (IO). The ongoing read workload results in data caches being built due to a topology change. Data caches can be write through or write back, and there may be caches based on metadata that is built from the content data that is being read. Discussed below are caches that consume a significant amount of resources on storage. The state of the art to some degree sometimes too eagerly builds and sustains full and extensive caches on redundant mirrors. When a failure is encountered, information about all local caches may be lost, and a reorganized topology may rebuild caches on a different computer more or less from scratch. In those ways, there is a design tension between maximizing cache replication for accelerated failover, versus minimizing cache replication to minimize consumption of computer resources such as memory and network bandwidth during ordinary operation.

Somewhat counterintuitively, the situation is even worse for a planned failure such as a software or configuration upgrade because typically multiple computers will go through a planned failure one after another in an administered cluster, and the performance of the system typically stays in a degraded state for a long time due to the sequential nature of administering redundant computers individually. An additional side effect of a topological role change is that even if an old mirror resumes a leadership role after a while, such as when administrative patching completes, the mix of data objects in the client workload could have shifted significantly in the time that it took that mirror to recover and/or role transition. During that transitional time, a rapidly evolving client workload may cause cache on a current leader to significantly diverge from content that might still be cached in the old leader. This means that disruptive cache rebuilding when leadership is retaken by the old leader will experience a second degraded performance cycle that is after a first degraded performance cycle when the old leader, for example, crashed. A workload incurring a same cost twice for one failure is highly undesirable.

This double penalty is, to some extent, more or less unmitigated by the following example memory-based structures. A storage index is an in-memory structure in a storage server such as an Exadata storage cell. A storage index minimizes IO operations by helping the storage server quickly determine whether a particular storage region contains data relevant to a query. A storage index helps a content scan to skip reading data that is not needed. For the working set of ongoing data processing, a columnar cache can maximize data locality.

DETAILED DESCRIPTION

Figure 1:
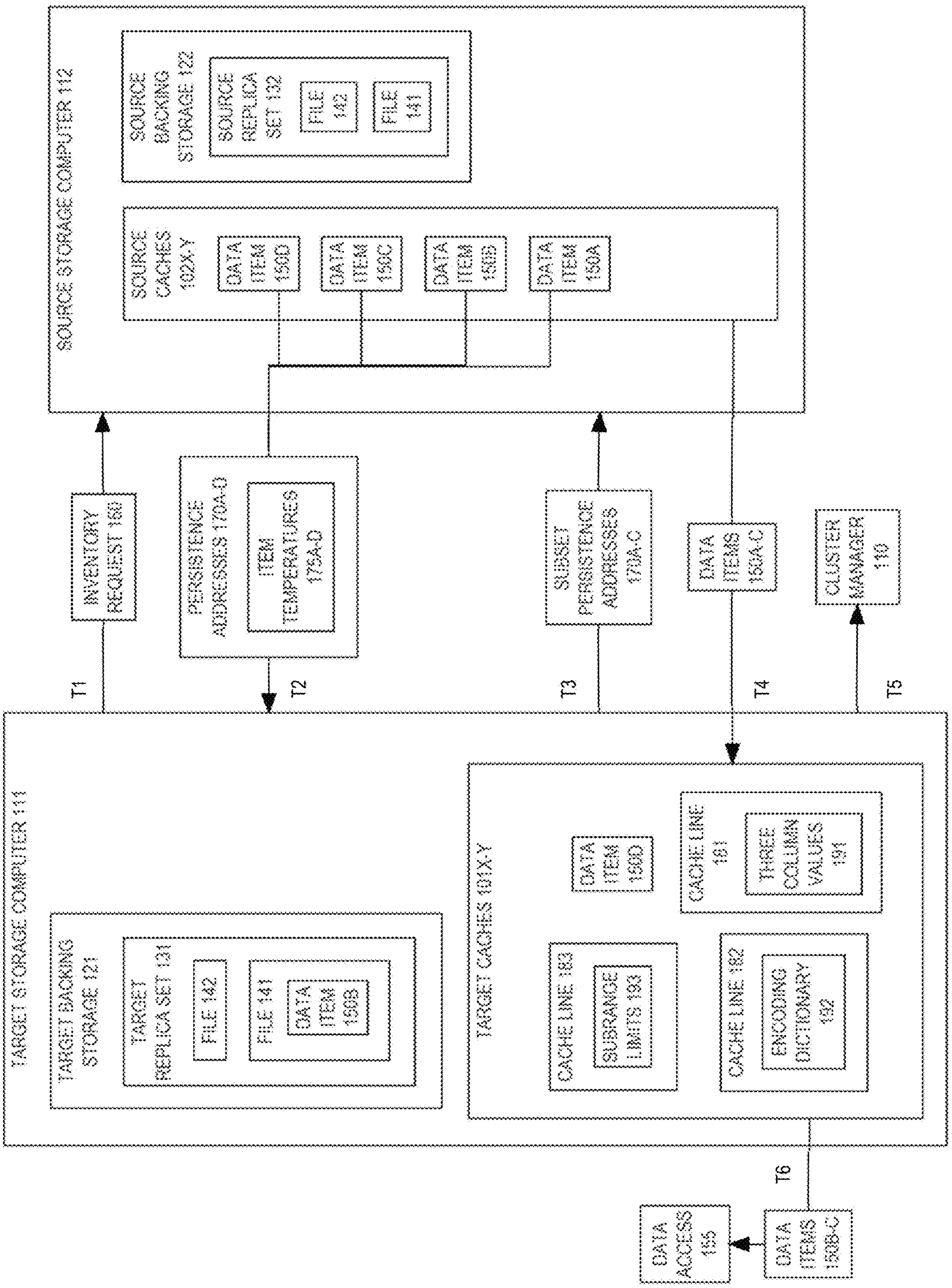
FIG. 1 is a block diagram that depicts an example cluster of computers that includes a target storage computer that accelerates prefilling of target caches by avoidance of persistent target backing storage and by bulk transfer from source caches of a source storage computer.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is cache prefilling that is accelerated by avoidance of persistent storage and by bulk transfer from caches of a remote computer. Referred to herein as 'CacheSync', this approach has a novel cache synchronization mechanism that facilitates reading remote content directly while all computers involved remain online. This allows for cache synchronization to be the fastest possible in a way that applies to any mix of types of caches, regardless of whether a cache is write through or write back, including caches of data content or of derived metadata.

This approach is well suited even when roles in a topology include asymmetry, such as many storage computers that are followers that process writes such as for online transaction processing (OLTP), and a leader storage computer to which all reads should be directed. For example, the leader storage computer may operate as a system of record for read-intensive workloads such as queries, online analytic processing (OLAP), and reporting. A leadership transition for maintenance (i.e. planned failures) or for load balancing after an unplanned failure is seamlessly handled by this approach so that there is a minimal IO performance impact on clients. This approach accelerates reads in an innovative way without any write IO performance impact.

This approach has efficient cache synchronization for retrieving cached data from other online mirrors while the target mirror stays fully online without additional locks for writes. This approach is aimed at ensuring that when a full cache sync is possible, the read workload transitions from a current leader to a new leader without a performance decrease. The client workload with this approach always transitions seamlessly across all planned failures such as patching and mirror relocation. A seamless leader transition is also possible when recovering from an unplanned failures such as: a) a mirror rebuild, b) resynchronization when an offline mirror comes back online, or c) repairing partial data loss on a mirror. This approach ensures that all caches, whether write through or write back, are fully and faithfully replicated on the new leader so that the role switch experiences no performance difference. If however a new leader with insufficient available memory does not permit a full cache replication, this approach propagates heat (i.e. usage frequency) information about contents of the caches. To fit into available storage, an embodiment may have heuristics-based filtering of cached data to limit synchronization.

When a target storage server starts this cache synchronization approach, a first step may be to reconcile caching information to identify logical addresses of data that should be synchronized. A cache information fetch request is sent to the current leader to obtain a list of all logical addresses of data that the leader is currently caching, the temperature (i.e. heat level) associated with them, and information about what type of cache is used for each of these logical addresses. After receiving such information, the target storage computer reconciles the address list against the local caching information to identify logical addresses that need synchronization into which caches. This list of logical address identifies the only data that will be synchronized from the current leader. If available storage on the target storage computer does not permit all data listed by the current leader to be cached, then an additional filtering step is performed to identify the best subset of logical addresses that should be cached. For example if only a percentage of the cache can be synchronized, this approach identifies the best x % subset of logical addresses to synchronize.

The approach herein may be performed by a target storage computer, such as a future leader, that receives cache content from a source storage computer such as a current leader. In a scenario discussed later herein, the target storage computer may have crashed and its recovery may be ongoing or recently finished. Recovery herein is granular and does not require replacement of a whole database or whole data file. During granular recovery that is accelerated, the source and target storage computers may be in service, and incorporated herein by reference in its entirety is U.S. patent application Ser. No. 19/013,291 REPAIR FOR PARTIAL DATA LOSS IN A DATABASE AWARE DISTRIBUTED DATA STORE filed on Jan. 8, 2025 by Siddharth Choudhary et al. By any technique in U.S. patent application Ser. No. 19/013,291 and by techniques herein, the target storage computer may simultaneously perform all of: a) prefill target caches from remote source caches, b) be in service for writes, including executing writes, and c) repair locally-lost persistent data. To allow for reading cached data directly from the source caches while keeping both source and target storage computers online, this approach leverages those incorporated techniques by starting a local delta, described therein, to create a repair barrier that diverts all incoming writes to additional storage. This temporary diversion of writes effectively lets the target mirror be treated as if it were in a read-only state. In that way during prefilling of target caches, this approach temporarily is the sole writer to the target caches, and other concurrent writers are excluded from the target caches for data coherence.

This approach entails at least the following innovations. This approach allows both the source and target storage computers to stay online during cache synchronization. For unconventional acceleration, writes during synchronization do not experience any additional locking or synchronization primitive. In an embodiment, writes are sent to all mirrors as they normally are, without special behavior or latency impact. For creating a cache, increasing its size, or populating it, a target storage computer that is being synchronized does not have to use the computer's local copy of data that may be incomplete or out of date. Because some derived caches, such as a columnar cache, are generated by performing slow and processor-intensive transformation on the original data, thus copying over these caches directly from the current leader is optimal. For mitigating impact of unplanned failure, this approach also allows for the potential new leader to be kept up to date with metadata information about caching, such as logical regions that are being cached right now and their temperature. In that way, all caches can be recreated faster in event of an unplanned failure. This decreases the performance impact of unplanned failure by decreasing how long is performance degraded.

The innovations of this approach provide the following advantages. Planned failures result in negligible if any performance impact from a leadership transition. An unplanned failure only initially results in a performance impact due to abrupt and forced leadership transition. Once the failure has been handled, any additional leadership transitions for load balancing, or when the failed resource is restored and leadership retaken, results in little or no performance impact for the client. Without compromising data integrity, this approach facilitates reading cache contents directly from remote caches even when writes are in progress.

Reading cache contents directly from the current leader's cache ensures a fastest cache synchronization by innovative avoidance of slow persistent storage such as a mechanical disk drive. Because writes are not affected in any way, no additional locking or synchronization of writes is needed, and this synchronization avoidance preserves write performance. Derived caches such as a storage index or a columnar cache are expensive to rebuild, and fetching these caches directly from the current leader avoids an expensive rebuild on a future leader. If resources do not permit full cache synchronization, an optimal subset can be selected to readily fit available resources and, for acceleration, these will be the only logical addresses of data that is synchronized.

1.0 Example Cluster of Storage Computers

FIG. 1 is a block diagram that depicts example cluster of computers 100 that includes target storage computer 111 that accelerates prefilling of target caches 101X-Y by avoidance of persistent target backing storages 121-122 and by bulk transfer from source caches 102X-Y of source storage computer 112. Each of storage computers 111-112 may be a rack server such as a blade, a mainframe, or other networked computer. Storage computers 111-112 are interconnected by one or more communication networks (not shown). In an embodiment, cluster of computers 100 is part of a datacenter or part of a public or private cloud.

High availability of files 141-142 is provided by redundant persistence of copies of files 141-142 in multiple replica sets 131-132 in respective backing storages 121-122 in respective storage computers 111-112 as shown. Each of backing storages 121-122 is a persistent store such as a portion, a whole, or an aggregation of storage drive(s) or flash memory. Depending on the embodiment, target backing storage 121 is inside target storage computer 111 or is connected to a same backplane as target storage computer 111. In an embodiment, storage components 111 and 121 each is a distinct printed circuit board card on a physical backplane such as a rack. In some embodiments, storage components 111 and 121 are separated by exactly zero or one network switch such as for ethernet or Fibre Channel. In any case, storage components 111 and 121 are collocated.

1.1 Storage Hierarchy has Various Latencies and Capacities

Backing storages 121-122 are designed to maximize capacity instead of speed, and backing storages 121-122 may be block-addressable devices that have high (e.g. mechanical) latency with worst cases unpredictably caused, in some cases, by background activities of the storage drive itself such as wear leveling. Caches 101X-Y and 102X-Y have low and steady latency and, in an embodiment, are volatile caches in volatile memory inside one of storage computers 111-112. Caches 101X-Y and 102X-Y are designed to maximize speed instead of capacity. Although caches 101X-Y and 102X-Y provide accelerated access to files 141-142, caches 101X-Y and 102X-Y do not have capacity to store both of files 141-142. For example, target storage computer 111 might not have enough volatile memory to store file 141.

Herein, target storage computer 111 can access data in a storage hierarchy that includes, in the following ascending order by latency, a sequence of storage tiers that are: i) target caches 101X-Y in local random access memory (RAM) or in local flash, ii) source caches 102X-Y in remote RAM or remote flash, and iii) target backing storage 121. For target storage computer 111, target backing storage 121 may be slower than source caches 102X-Y in remote RAM or remote flash, even if target backing storage 121 is inside target storage computer 111.

Those three storage tiers (i)-(iii) may become incoherent. For example, a first and second tiers might contain different versions of data item 150B, and a third tier might not contain data item 150B and, in that case, none of the three storage tiers (i)-(iii) agree on what is the state of file 141 that contains data item 150B as shown in target replica set 131. Incoherence (e.g. absence) of data in target storage computer 111 is more likely while target storage computer 111 undergoes a disruptive lifecycle transition such as any of: a) returning to service after maintenance, b) switching role from a follower or standby to a leader or primary, c) recovering from a crash, or d) joining cluster of computers 100 as a newly allocated storage computer such as for elastic horizontal scaling in a computer cloud.

In an embodiment, multiple (e.g. all) storage computers in cluster of computers 100 receive and fulfill write requests for data in files 141-142 and, depending on the embodiment, a write request is sent to any one storage computer or broadcast to all storage computers. In an embodiment, only source storage computer 112 is configured as a read leader that should receive all read requests, and all other storage computers in cluster of computers 100 are followers as discussed later herein. Read and write requests are access requests that are discussed later herein.

1.2 Increasing Data Locality by Caching, and Acceleration by Solid State Media Such as Flash and Random Access Memory (RAM)

The approach herein is not synchronous (i.e. responsive) to an access request. The approach herein entails a temporal sequence of shown times T1-T5. Discussed later herein is later time T6 that integrates the approach herein with data access 155.

At time T1, target storage computer 111 begins self-configuring to (re-)enter service or to switch roles as discussed above. At time T1, target caches 101X-Y are empty (e.g. new) or contain some irrelevant data items that are stale (i.e. not latest version), infrequently used, or no longer being processed. At time T1 in an embodiment, target caches 101X-Y are created or increased in size. Herein, eager warming of a cache to increase the cache's hit rate for acceleration is referred to as cache prefilling, which is accelerated in a new way as follows. At time T1, target storage computer 111 initiates cache prefilling acceleration by sending innovative inventory request 160 to source storage computer 112 over a communication network. In an embodiment, inventory request 160 consists of a single internet protocol (IP) packet.

Source storage computer 112 receives and fulfils inventory request 160 as follows. Source storage computer 112 contains RAM that contains source caches 102X-Y that contain (e.g. copies of) data items 150A-D. As discussed later herein, a data item may contain data (e.g. content of file 141) and additionally, in some cases, metadata such as a statistic about content of file 141. Different types of data items are discussed later herein.

In an embodiment, data item 150B is a portion (i.e. subsequence of rows) of a column in a database table that is stored in columnar (i.e. column major) format instead of row major. In that case, file 141 may be a columnar file that contains a portion, a whole, or an aggregation of table column(s). For example, a column may contain a sequence of millions of Boolean values, and data item 150B may contain a subsequence of that sequence.

1.3 Storage Blocks, Logical Block Address (LBA), and Persistence Addresses

In an embodiment, backing storages 121-122 are block-addressable by, for example, logical block address (LBA) that may be an address of a storage block (not shown) such as a disk block or a flash block. Persistence addresses 170A-D are respective addresses of data items 150A-D in source backing storage 122. For example, persistence address 170B is the storage address of data item 150B. In an embodiment, backing storages 121-122 are identically sized. Herein, a same persistence address 170B can be used to locate data item 150B in both of backing storages 121-122. In an embodiment, persistence address 170B may contain in addition to an address of a storage block: a) an identified cache type of one of source caches 102X-Y that contains data item 150B, b) a byte offset to the beginning of data item 150B from the start of the storage block and/or c) a size of data item 150B if less than the size of the storage block. For example as discussed later herein, a storage block may contain multiple data items, and each data item may be cached in its own respective distinct cache line. In another embodiment discussed later herein, file 141 does not contain a database column, but instead contains persistent metadata for optimized storage or optimized access for a database column. For example, file 141 may contain many metadata entries, and data item 150B may contain a subset of those metadata entries.

As discussed earlier herein, source storage computer 112 is in service at time T1. For example if the union of all data items in source caches 102X-Y and in source replica set 132 is complete and current, then source storage computer 112 may be effectively used as a system of record, even for data items that are current in source caches 102X-Y but missing or not current in source backing storage 122. Also as discussed earlier herein, data items may be missing or stale in target caches 101X-Y at time T1, and target caches 101X-Y are more or less cold. Inventory request 160 causes source storage computer 112 to enumerate persistence addresses 170A-D respectively of all data items 150A-D that are in source caches 102X-Y and, at time T2, source storage computer 112 responsively sends persistence addresses 170A-D to target storage computer 111 as requested. As discussed later herein, persistence addresses 170A-D do not include addresses of data items that have been invalidated in source caches 102X-Y. That is herein, invalidated data items in source caches 102X-Y are ignored (i.e. not processed) and, as discussed later herein, a cache line that contains an invalidated data item is treated as an empty cache line that does not contain a data item. By receiving persistence addresses 170A-D at time T2, target storage computer 111 is dynamically informed of the contents of source caches 102X-Y.

1.4 Reconciliation with Remote Cache

Target storage computer 111 compares persistence addresses 170A-D to the persistence addresses of data items already in target caches 101X-Y, such as data item 150D as shown. Subset persistence addresses 170A-C excludes data item 150D and is the subset of received persistence addresses 170A-D whose data items are not already in target caches 101X-Y and, at time T3, target storage computer 111 sends subset persistence addresses 170A-C to source storage computer 112. Responsively at time T4, source storage computer 112 sends data items 150A-C, having subset persistence addresses 170A-C, to target storage computer 111.

In a scenario not shown, data item 150A is evicted from or invalidated in one of source caches 102X-Y between times T3-T4. Even though subset persistence addresses 170A-C includes persistence address 170A for data item 150A, data item 150A is not sent at time T4 due to that eviction, even if source backing storage 122 contains the current data item 150A. That is at time T4, only data items still in source caches 102X-Y are sent, and target storage computer 111 may receive fewer data items than requested. There may be many evictions or invalidations in source caches 102X-Y between times T3-T4, and the set of data items in source caches 102X-Y may evolve so rapidly that persistence addresses 170A-D at time T2 may be somewhat or mostly inaccurate (i.e. including evicted, invalidated, or newly cached data items) at time T4, which may be remediated by repeating times T1-T4 as discussed later herein.

At time T4, target storage computer 111 receives and stores data items 150A-C into target caches 101X-Y. As discussed earlier herein, in one example: a) data items 150A-B are metadata entries, and data item 150C is not metadata; and b) target cache 101X is a metadata cache, and target cache 101Y is not. For example, a columnar cache that caches column content is not a metadata cache. In that case at time T4, data items 150A-B are stored into target cache 101X, and data item 150C is stored into target cache 101Y. The following are different types metadata, each of which aggregates its own respective distinct type of metadata entries.

Types of caches may be distinguished by cache content type, write policy (i.e. write through versus write back), eviction policy (e.g. least recently used, LRU) and, as follows, durability and address granularity and. Address granularity (i.e. alignment) may be block (i.e. bulk) addressable or byte addressable. Random access memory (RAM) is byte addressable. Flash and solid state disk drives (SSDs) are block addressable. Durability may be volatile or nonvolatile. Each of target caches 101X-Y may be a respective (e.g. distinct) combination of those cache types, such as volatile dynamic RAM (DRAM) or block-addressable nonvolatile flash. Although caches 101X and 102X may have distinct sizes, caches 101X and 102X have the same combination of cache types, such as byte-addressable persistent memory (PMEM).

1.5 Compression and Types of Caches and Cache Entries

Herein, a cache entry has a fixed size and is referred to as a cache line. In an embodiment, target caches 101X-Y contain many fixed-size cache lines, and each of target caches 101X-Y may have its own respective distinct cache line size that has exact capacity for a data item of a respective type. For example as shown, cache lines 181-183 each stores a respective distinct type of data item that may have a respective distinct fixed size that is identical to the respective sizes of cache lines 181-183. In that case of three distinct types of data items, target caches 101X-Y may actually be three or more target caches of distinct respective types. That is, each of cache lines 181-183 is in a distinct respective target cache.

Assuming for demonstration that target caches 101X-Y already are prefilled with special data items 191-193, subsequent usage of special data items 191-193 is as follows. Cache line 181 stores at least three column values 191 that, depending on the embodiment, contain: a) only data and no metadata and, for example, the three values incidentally may or may not be identical or b) run length encoding (RLE) that compresses by replacing redundant data with (i.e. less) metadata, in which case the three values are either distinct or duplicate values remaining after encoding are non-adjacent (i.e. not in a same run). In an embodiment, three column values 191 are from a column in a database table. In an embodiment, files 141-142 each consists of a logical sequence of storage blocks, and data item 150B is both of: a) a storage block that consists of a contiguous sequence of bytes in file 141 and b) in that storage block, three column values 191 that contains of as many values as are stored in the storage block. In an embodiment, a cache may be an input/output (IO) buffer cache, and each data item in the cache is a storage block from files 141-142.

Cache line 182 instead contains a data item that is a whole or partial encoding dictionary 192 that is metadata that contains distinct possible values that might occur in, for example, column(s) of values. If a whole encoding dictionary contains tens of thousands of distinct possible values, then the whole encoding dictionary may consist of multiple data items that are partial encoding dictionaries such as, for example, encoding dictionary 192. Each partial encoding dictionary contains a disjoint (i.e. nonintersecting) subset of the distinct possible values of the whole dictionary.

In an embodiment, a partial encoding dictionary may interoperate with data items 150A-B as follows, where data item 150A is three column values 191 that is being encoded or decoded by data item 150B that is encoding dictionary 192. In that embodiment: a) the whole encoding dictionary may span three partial encoding dictionaries that are data items 150B-150D; b) a database column contains enough values to provide multiple non-metadata items including data item 150A; and c) of those multiple non-metadata items, only data item 150A is retrieved for further processing (e.g. returned by a so-called smart scan of that database column or a different column in a same database table).

For acceleration of target storage computer 111, both of data items 150A-B should be in respective separate caches of target caches 101X-Y. Even though the whole encoding dictionary spans those three partial encoding dictionaries that are data items 150B-150D, and even though all three partial encoding dictionaries would be used to encode or decode the whole column, because only data item 150A is being processed (e.g. as returned by a smart scan), only the partial encoding dictionary that is data item 150B is needed in this example, and the other two partial encoding dictionaries may, for example, be absent from target caches 101X-Y. That is an example of partial avoidance of an aggregation of metadata items by avoiding some of the constituent metadata items. In the case of prefilling target caches 101X-Y, this avoidance accelerates time T4 that can avoid sending constituent metadata items that were absent in source caches 102X-Y.

1.6 Subrange Metadata for Scan Acceleration

An example of another type of constituent metadata items is subrange limits 193. Unlike encoding dictionary 192 that, even if only a partial encoding dictionary, can be reused to encode or decode an unlimited count of data items, subrange limits 193 can be used for at most a fixed count of data items as follows. As discussed earlier herein, even one constituent metadata item may contain multiple metadata entries. Each metadata entry in subrange limits 193 represents a respective distinct data item, such as when a database column contains enough values for multiple data items and, in some cases, enough values for multiple metadata items that each is a different set of subrange limits for a different set of data items from the same column.

Encoding dictionary 192 operates as a map between each distinct dictionary key (i.e. dictionary code) and a respective possible value. Subrange limits 193 instead operates as a map whose keys are persistence addresses of data items and whose values are some or all of the values that actually occur in those data items. In an embodiment: a) data item 150A is three column values 191 that are values in a database column; b) data items 150B-D also contain values from that column; and c) subrange limits 192 is a metadata item with capacity for two metadata entries and thus may operate as a map having two map entries for only two of the four data items A-D.

Each metadata entry in subrange limits 193 is a key-value pair whose value is a set of one or more actual values from the data item represented by the entry. Depending on the embodiment of subrange limits 193, a particular data item may be represented by a particular metadata entry whose one or more actual values are: a) exactly two values that are a minimum value and a maximum value for the values that occur in the particular data item, b) a set of all unique values that occur in the particular data item, or c) a frequency map of unique values to counts (i.e. frequencies) of how many occurrences of repeated values in the particular data item.

As discussed earlier herein, persistence addresses 170A-D are guaranteed to exactly reflect source caches 102X-Y only at time T2 and not after (e.g. time T4), and times T1-T4 may be repeated until stopping criteria occur such as a maximum repetition count, a maximum elapsed time, a maximum count or bytes of data items transferred over multiple times T4 or, for saving time and electricity by early stopping, a minimum count of subset persistence addresses 170A-C at current time T3. These stopping criterion(s) ensure that prefilling target caches 101X-Y is accurate and complete without delay at accomplishing a role change or a return or entry to service of target storage computer 111. Thus, techniques herein do not decelerate any lifecycle phase or transition of components 100 and 111. A first or eventual occurrence of time T4 causes target caches 101X-Y to be sufficiently prefilled and in an embodiment, at time T5, target storage computer 111 notifies cluster manager 110 (e.g. and storage computer 112 and others) that target storage computer 111 has completed a role switch or entry into service. For example, time T5 may announce that target storage computer 111 is the new leader that may, for example, be a crashed and recovered old leader returning to service. In an embodiment, cluster manager 110 is, or is hosted in, a computer that is not a storage computer. Cluster manager 110 may operate as a central coordinator for a storage computer lifecycle activity that involves storage computer(s).

When target storage computer 111 is in service after target caches 101X-Y are prefilled, a remote computer that is not a storage computer, such as a client computer or a database server computer, may send a data access request at time T6 to perform data access 155 to access data in file 141 and/or 142. In the shown example, target storage computer 111 fulfills data access 155 at time T6 by responsively sending data items 150B-C to the remote computer. For example, data items 150B-C may be returned from a smart scan by target storage computer 111 and, at time T6, a database server receives those data items 150B-C and processes them further to generate an answer to a database query.

2.0 Example Cache-to-Cache Prefill Process

Figure 2:
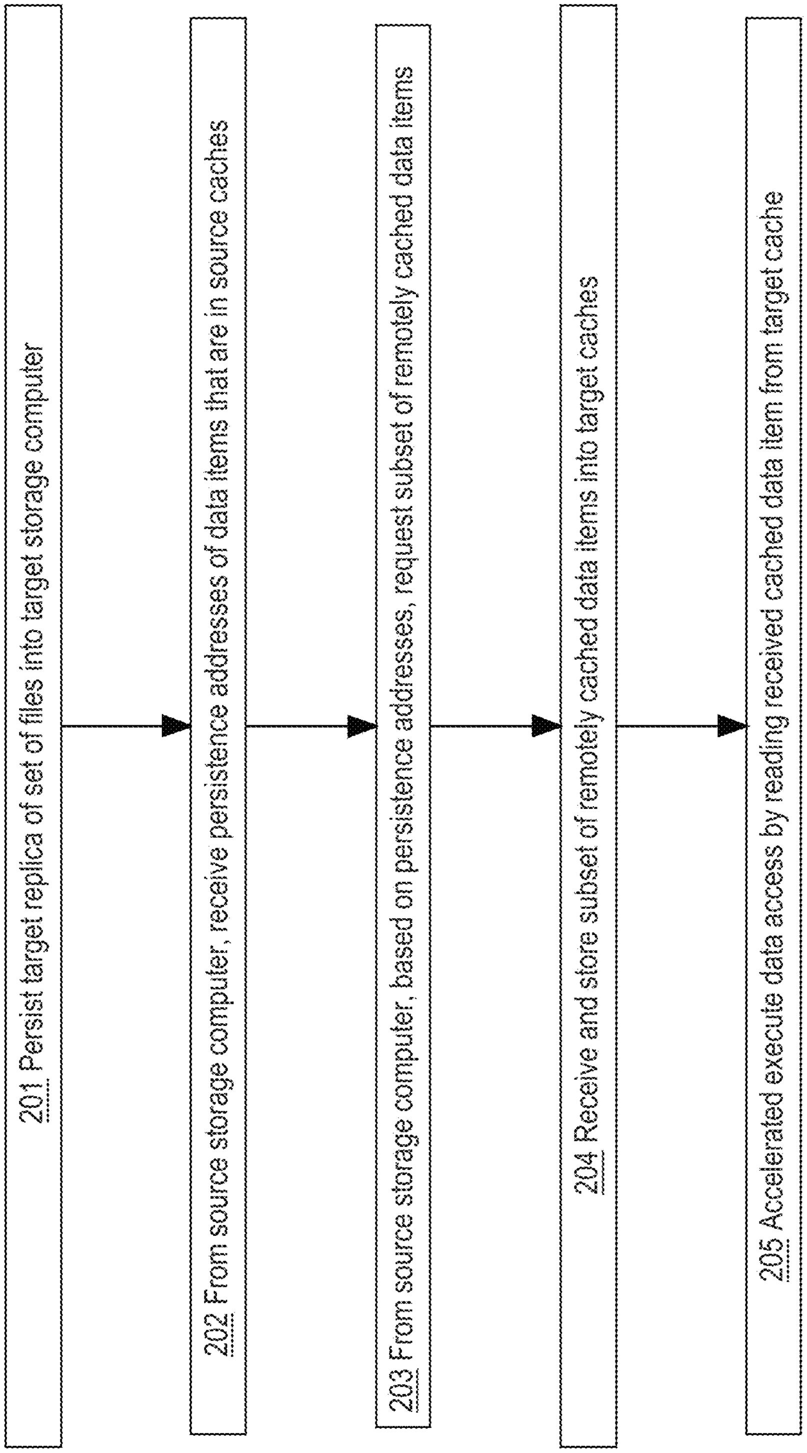
FIG. 2 is a flow diagram that depicts an example process that a target storage computer may perform to accelerate prefilling of target caches by avoidance of persistent storage by receiving data items from source caches instead of from source and target backing storages.

FIG. 2 is a flow diagram that depicts an example process that target storage computer 111 may perform to accelerate prefilling of target caches 101X-Y by avoidance of persistent storage by receiving data items from source caches 102X-Y instead of from backing storages 121-122.

Before time T1 in FIG. 1, step 201 persists target replica set 131 into target backing storage 121 as discussed earlier herein. Inventory request 160 is sent at time T1 that occurs between steps 201-202. Time T1 causes time T2 and step 202 as discussed earlier herein. From source storage computer 112 at time T2, step 202 receives persistence addresses 170A-D of data items 150A-D that are in source caches 102X-Y as discussed earlier herein.

Step 202 causes time T3 and step 203. From source storage computer 112 at time T3, based on persistence addresses 170A-D and the persistence addresses of data items already in target caches 101X-Y, step 203 at time T3 sends a cache transfer request that contains subset persistence addresses 170A-C to retrieve data items 150A-C as discussed earlier herein. Step 203 causes time T4 and step 204. Step 204 at time T4 receives and stores data items 150A-C into target caches 101X-Y as discussed earlier herein.

Between steps 204-205: time T5 occurs; prefilling target caches X-Y is finished; and target storage computer 111 has completed its transition into service or into a role such as leader. In an embodiment after time T5, target storage computer 111 normally processes read requests and/or write requests from remote computer(s). In the example shown in FIG. 1, step 205 at time T6 accelerated executes data access 155 by reading data items 150B-C from target caches 101X-Y in random access memory (RAM). Step 205 does not use storage components 112 and 121, and this avoidance of network and avoidance of persistence are maximal data locality that accelerates step 205.

The following scenario demonstrates data integrity by design and orthogonal to known integrity mechanisms such as a dirty (i.e. modified) flag that marks a cache line in a write-back cache as clean or dirty. Herein, a clean cache line contains an unmodified data item that does not need to be flushed to the backing storage because the data item already is consistent with the backing storage). Herein, a dirty cache line contains a current (i.e. latest) version of a data item that is stale (i.e. old version) or absent in the backing storage. At none, some, or all of times T1-T5, source caches 102X-Y may contain a dirty data item (i.e. data item in a dirty cache line). For example if source cache 102X is a write-back cache, and data item 150A is dirty, then persistence addresses 170A-D at time T2 may contain the address of dirty data item 150A, and/or subset persistence addresses 170A-C at time T3 may contain the address of dirty data item 150A. Likewise, data items 150A-C at time T4 may contain dirty data item 150A that is inconsistent with backing storages 121-122. In those ways at times T2 and T4 as shown in FIG. 1, source storage computer 112 sends information to target storage computer 111, and that information does not indicate that any data item is dirty, even though source storage computer 112 tracks dirty data items in any of source caches 102X-Y that are write-back caches. At time T4 when data items 150A-C, including dirty data item 150A, are stored into target caches 101X-Y, data item 150A is not marked as dirty in write-back target cache 101X. With perfect data integrity herein, an unconventional result of time T4 may be simultaneously all of: a) identical copies of data item 150A are in write-back caches 101X and 102X; b) the source copy of data item 150A may be marked dirty, and the target copy of data item 150A may instead be marked clean; even if c) neither backing storages 121-122 contain data item 150A. For example in that case of (c), techniques in U.S. patent application Ser. No. 19/013,291 guarantee that target backing storage 121 will soon receive and store a copy of the latest version of data item 150A which may, for example, cause data item 150A to be coherent in at least storage containers 101X, 102X, and 121. That is at time T4, it is unnecessary to mark data item 150A as dirty in write-back target cache 101X because target backing storage 121 will receive an identical or more recent version of data item 150A from another storage computer, such as source storage computer 112.

3.0 Example Cache-to-Cache Prefill Activities

Figure 3:
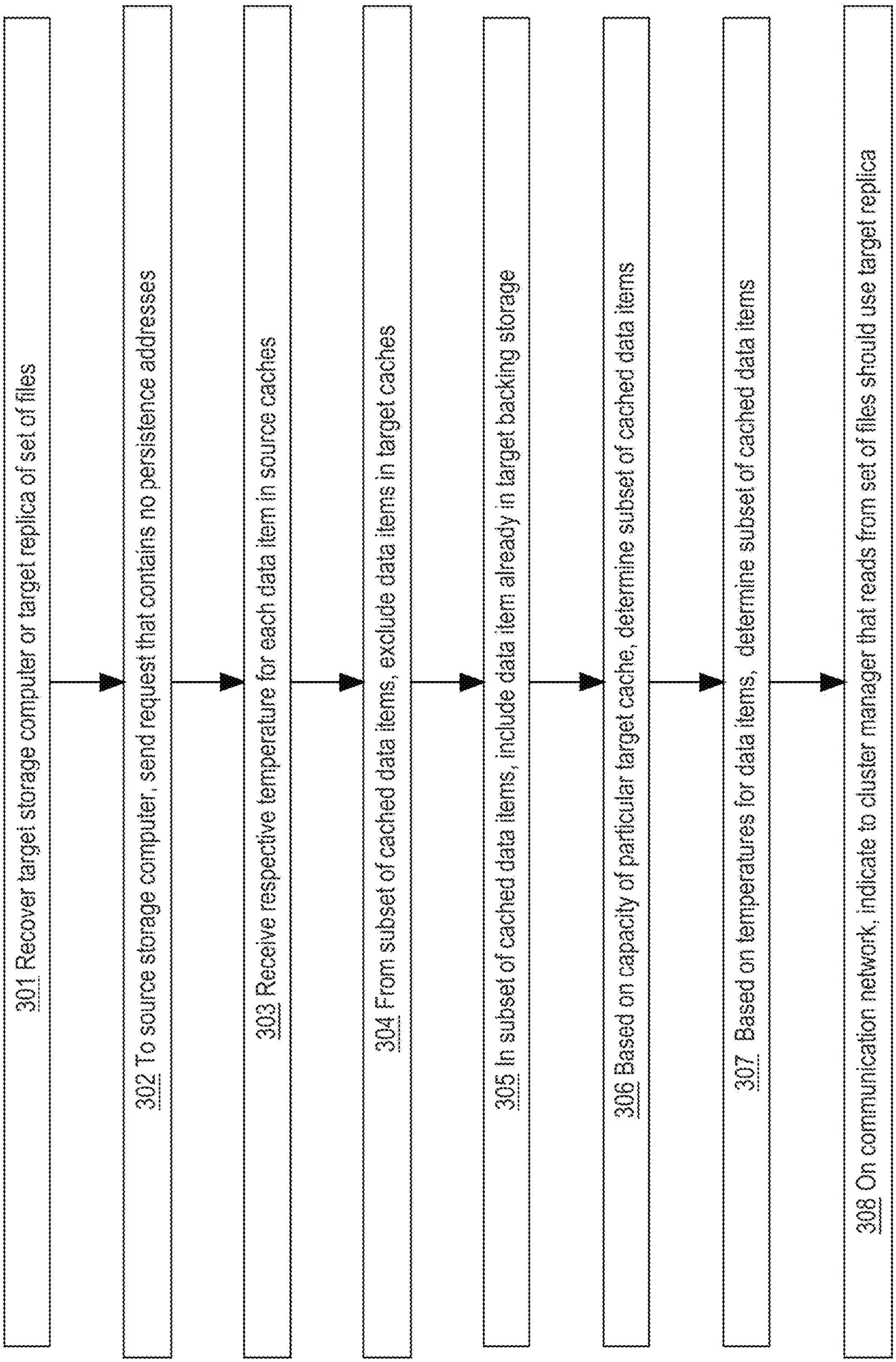
FIG. 3 is a flow diagram that depicts example activities that a target storage computer may perform to accelerate prefilling target caches.

FIG. 3 is a flow diagram that depicts example activities that target storage computer 111 may perform to accelerate prefilling target caches 101X-Y. The processes and steps of FIGS. 2-3 are compatible and may be combined. In this example scenario: a) target storage computer 111 has already crashed or a storage drive that contains target backing storage 121 has already crashed; and b) step 301 recovers target storage computer 111 or target replica set 131. Other scenarios are less drastic and do not entail crashing and recovery and, in that case, step 301 is skipped. Steps 302-308 may occur regardless of whether or not step 301 occurs. If step 301 occurs, then steps 302-308 are sub-steps of step 301 and occur concurrent to step 301. In an embodiment: a) a recovery process performs step 301; b) a cache prefill process performs steps 302-307; and c) for acceleration, processes (a)-(b) are concurrent to each other. That is, target storage computer 111 can begin and finish refilling target caches 101X-Y while target replica set 131 is being rebuilt (i.e. recovered), such as while a storage drive of target backing storage 121 is being rebuilt.

To source storage computer 112 at time T1, step 302 sends inventory request 160 that contains no persistence addresses and contains none of data structures 150A-D and 170A-D. Step 303 receives item temperatures 175A-D respectively for each data item 150A-D in source caches 102X-Y. Depending on the embodiment at time T2, step 303 receives temperatures either accompanying persistence addresses 170A-D as shown in FIG. 1 or separately from cluster manager 110. That is, which of remote components 110 and 112 provides item temperatures 175A-D may depend on the embodiment.

From subset persistence addresses 170A-C at time T3, step 304 excludes addresses of data items that already are in target caches 101X-Y. For example if a storage drive of target backing storage 121 crashed, or if target storage computer 111 is being promoted (i.e. switching roles) to leader, then target caches 101X-Y already contain some data items, such as data item 150D as shown in FIG. 1. If target storage computer 111 crashed instead, then target caches 101X-Y are empty at time T3, and step 304 can be skipped or does nothing.

In subset persistence addresses 170A-C at time T3, step 305 may include an address of a data item that already is in target backing storage 121, such as data item 150B as shown in FIG. 1. Step 305 does not detect whether target backing storage 121 does or does not contain data item 150B. Step 305 does not detect whether data item 150B in target backing storage 121 is a stale version or a current version. In that way for acceleration, prefilling steps 302-307 avoid (i.e. do not use) persistent storage.

Each of target caches 101X-Y may have a respective fixed capacity that may, in some scenarios, be less than capacities of corresponding source caches 102X-Y. That is at time T2, persistence addresses 170A-D may indicate that source caches 102X-Y can provide more data than target caches 101X-Y can store. Based on capacity of target cache 101X, for example, step 306 determines subset persistence addresses 170A-C at time T3 by deciding which data items should be excluded due to lack of capacity.

Step 307 is a sub-step or implementation of step 306. Based on item temperatures 175A-D for data items 150A-D, step 307 determines subset persistence addresses 170A-C at time T3. Due to lack of target cache capacity or, for acceleration due to a maximum limit on a count of subset persistence addresses 170A-C, step 307 may select only higher temperature addresses for inclusion in subset persistence addresses 170A-C.

At time T4 between steps 307-308, target storage computer 111 completes prefilling caches 101X-Y and completes transitioning into service or into a role such as leader. On a communication network at time T5 in a scenario where that transition entails becoming a read leader as discussed earlier herein, step 308 indicates to cluster manager 110 that future reads of data from files 141-142 should use target replica set 131 in target storage computer 111. Cluster manager 110 may responsively broadcast an announcement that target storage computer 111 is the new read leader, and that announcement may be broadcast to some or all of: client computers, database server computers, and/or all storage computers.

4.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
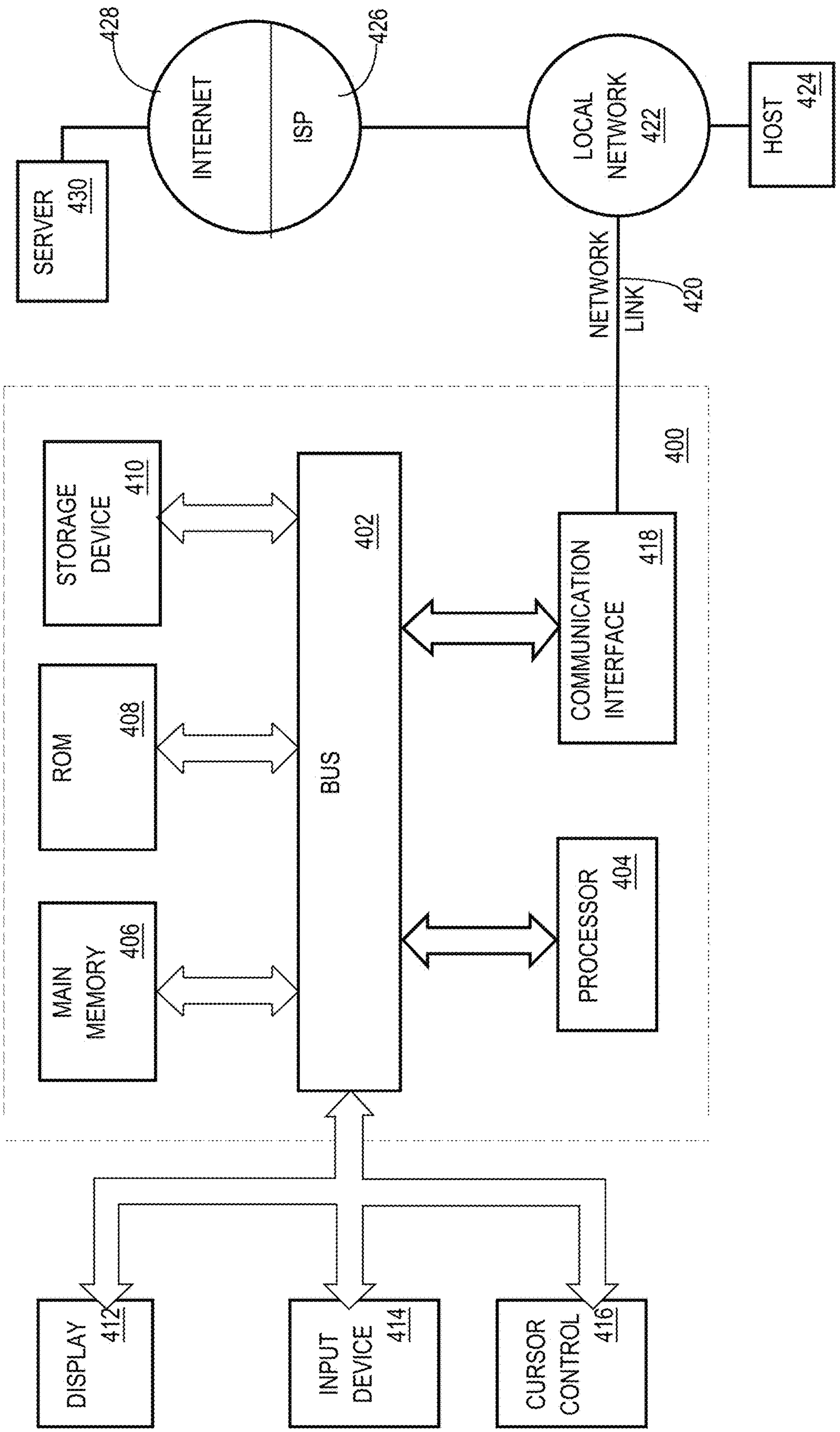
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
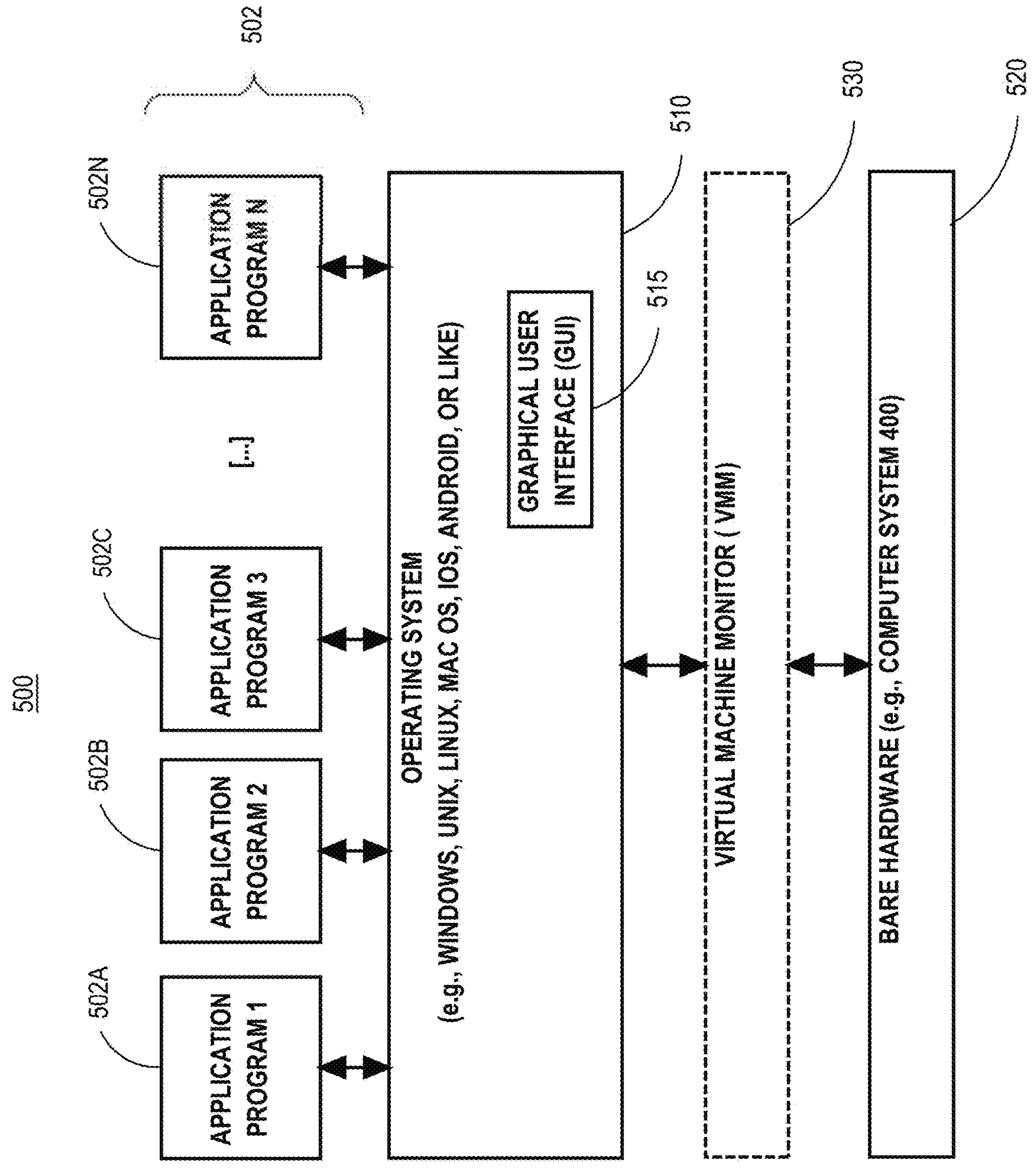
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

persisting a target replica of a set of files into a target storage computer that contains at least one target cache that is not in a backing storage of the target storage computer;

receiving, from a source storage computer, persistence addresses of a plurality of cached data items that are in at least one source cache of the source storage computer, wherein:

the at least one source cache is not in a backing storage of the source storage computer, and a source replica of the set of files is persistent in the source storage computer;

requesting from the source storage computer, based on the persistence addresses of the plurality of cached data items, a subset plurality of the plurality of cached data items;

storing, after said requesting, the subset plurality of the plurality of cached data items into the at least one target cache; and executing a data access by reading a cached data item of the subset plurality of the plurality of cached data items from the at least one target cache;

wherein the method is performed by the target storage computer.

2. The method of claim 1 wherein:

a particular plurality of caches is the at least one target cache or the at least one source cache;

the particular plurality of caches includes at least two of: a write-back cache, a write-through cache, a columnar cache, a nonvolatile cache, a cache of disk blocks, and a cache of minimum and maximum values.

3. The method of claim 1 wherein:

said receiving comprises receiving a respective temperature for each data item in the plurality of cached data items;

the method further comprises:

to the source storage computer, sending a request that contains none of the persistence addresses of the plurality of cached data items, and determining the subset plurality of the plurality of cached data items based on the temperatures for the plurality of cached data items;

said sending causes said receiving.

4. The method of claim 3 wherein:

the at least one target cache does not have capacity for the plurality of cached data items;

said determining is based on a capacity of the at least one target cache.

5. The method of claim 1 wherein:

the method further comprises recovering the target storage computer or the target replica of the set of files;

said receiving occurs during said recovering;

the at least one source cache has less capacity than the at least one target cache.

6. The method of claim 1 further comprising before said requesting, excluding, from the subset plurality of the plurality of cached data items, cached data items in the at least one target cache.

7. The method of claim 1 further comprising before said requesting, including, in the subset plurality of the plurality of cached data items, a data item in the backing storage of the target storage computer.

8. The method of claim 1 wherein the subset plurality of the plurality of cached data items comprises at least two of:

a first cache line that comprises exactly one or two values from a database column, a second cache line that comprises an encoding dictionary, and a third cache line that comprises at least three values from the database column, wherein the third cache line does not comprise an encoding dictionary.

9. The method of claim 1 wherein:

the subset plurality of the plurality of cached data items includes a dirty data item;

during said requesting, the backing storage of the target storage computer contains a stale version of the dirty data item;

said receiving is a first receiving;

the method further comprises after said requesting, second receiving the subset plurality of the plurality of cached data items from the source storage computer;

said first receiving and said second receiving do not indicate that the dirty data item is dirty;

said storing does not cause the dirty data item to be marked as dirty in the at least one target cache.

10. The method of claim 1 further comprising on a communication network, indicating to a cluster manager that reads from the set of files should use the target replica of the set of files.

11. One or more computer-readable non-transitory media storing instructions that, when executed by one or more computers, cause:

persisting a target replica of a set of files into a target storage computer that contains at least one target cache that is not in a backing storage of the target storage computer;

receiving, from a source storage computer, persistence addresses of a plurality of cached data items that are in at least one source cache of the source storage computer, wherein:

the at least one source cache is not in a backing storage of the source storage computer, and a source replica of the set of files is persistent in the source storage computer;

requesting from the source storage computer, based on the persistence addresses of the plurality of cached data items, a subset plurality of the plurality of cached data items;

storing, after said requesting, the subset plurality of the plurality of cached data items into the at least one target cache; and executing a data access by reading a cached data item of the subset plurality of the plurality of cached data items from the at least one target cache.

12. The one or more computer-readable non-transitory media of claim 11 wherein the at least one target cache comprises at least two of: a write-back cache, a write-through cache, a columnar cache, a nonvolatile cache, and a cache of minimum and maximum values.

13. The one or more computer-readable non-transitory media of claim 11 wherein:

said receiving comprises receiving a respective temperature for each data item in the plurality of cached data items;

the instructions further cause:

to the source storage computer, sending a request that contains none of the persistence addresses of the plurality of cached data items, and determining the subset plurality of the plurality of cached data items based on the temperatures for the plurality of cached data items;

said sending causes said receiving.

14. The one or more computer-readable non-transitory media of claim 13 wherein:

the at least one target cache does not have capacity for the plurality of cached data items;

said determining is based on a capacity of the at least one target cache.

15. The one or more computer-readable non-transitory media of claim 11 wherein:

the instructions further cause recovering the target storage computer or the target replica of the set of files;

said receiving occurs during said recovering;

the at least one source cache has less capacity than the at least one target cache.

16. The one or more computer-readable non-transitory media of claim 11 wherein the instructions further cause before said requesting, excluding, from the subset plurality of the plurality of cached data items, cached data items in the at least one target cache.

17. The one or more computer-readable non-transitory media of claim 11 wherein the instructions further cause before said requesting, including, in the subset plurality of the plurality of cached data items, a data item in the backing storage of the target storage computer.

18. The one or more computer-readable non-transitory media of claim 11 wherein the subset plurality of the plurality of cached data items comprises at least two of:

a first cache line that comprises exactly one or two values from a database column, a second cache line that comprises an encoding dictionary, and a third cache line that comprises at least three values from the database column, wherein the third cache line does not comprise an encoding dictionary.

19. The one or more computer-readable non-transitory media of claim 11 wherein:

the subset plurality of the plurality of cached data items includes a dirty data item;

during said requesting, the backing storage of the target storage computer contains a stale version of the dirty data item;

said receiving is a first receiving;

the instructions further cause after said requesting, second receiving the subset plurality of the plurality of cached data items from the source storage computer;

said first receiving and said second receiving do not indicate that the dirty data item is dirty;

said storing does not cause the dirty data item to be marked as dirty in the at least one target cache.

20. The one or more computer-readable non-transitory media of claim 11 wherein the instructions further cause on a communication network, indicating to a cluster manager that reads from the set of files should use the target replica of the set of files.

* * * * *